US011366712B1

(12) United States Patent
Srivatsa et al.

(10) Patent No.: US 11,366,712 B1
(45) Date of Patent: Jun. 21, 2022

(54) ADAPTIVE LOG ANALYSIS

(71) Applicant: INTERNATIONAL BUSINESS MACHINES CORPORATION, Armonk, NY (US)

(72) Inventors: Mudhakar Srivatsa, White Plains, NY (US); Raghu Kiran Ganti, White Plains, NY (US); Jae-Wook Ahn, Nanuet, NY (US); Shreeranjani Srirangamsridharan, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/110,276

(22) Filed: Dec. 2, 2020

(51) Int. Cl.
*G06F 11/07* (2006.01)
*G06F 16/18* (2019.01)
*H04L 41/069* (2022.01)
*G06F 40/186* (2020.01)
*G06F 40/242* (2020.01)

(52) U.S. Cl.
CPC ...... *G06F 11/0772* (2013.01); *G06F 11/0709* (2013.01); *G06F 16/1865* (2019.01); *G06F 40/186* (2020.01); *G06F 40/242* (2020.01); *H04L 41/069* (2013.01)

(58) Field of Classification Search
CPC .. G06F 11/0772; G06F 40/242; G06F 40/186; G06F 11/0709; G06F 16/1865; H04L 41/069
USPC ........................................................ 714/45
See application file for complete search history.

(56) References Cited

U.S. PATENT DOCUMENTS

| 8,423,493 | B2 | 4/2013 | Moerchen et al. | |
|---|---|---|---|---|
| 2014/0188900 | A1* | 7/2014 | Sankaran | H03M 7/3084 707/749 |
| 2018/0232425 | A1* | 8/2018 | Das | G06F 16/2471 |
| 2019/0286552 | A1* | 9/2019 | Sharma | G06F 11/3692 |

FOREIGN PATENT DOCUMENTS

| CN | 103577307 A | 2/2014 |
|---|---|---|
| CN | 103761173 A | 4/2014 |
| CN | 104104734 A | 10/2014 |
| CN | 109308289 A | 2/2019 |

(Continued)

OTHER PUBLICATIONS

Mell, P. et al., "Recommendations of the National Institute of Standards and Technology"; NIST Special Publication 800-145 (2011); 7 pgs.

*Primary Examiner* — Yair Leibovich
(74) *Attorney, Agent, or Firm* — Intelletek Law Group, PLLC; Gabriel Daniel, Esq.

(57) ABSTRACT

A method for obtaining information and status about a monitored system by adaptively analyzing log messages is provided. A log analyzer receives log messages generated by a monitored system. The log analyzer identifies static and variable portions in the received log messages. The log analyzer generates a template based on the identified static and variable portions of the received log messages. The log analyzer computes a metric for the generated template based on a number of log messages that fall within the template. The log analyzer reports a status in the monitored system based on the computed metric.

20 Claims, 9 Drawing Sheets

(56) References Cited

FOREIGN PATENT DOCUMENTS

| CN | 105049247 B | 4/2019 |
|----|-------------|--------|
| CN | 106407096 B | 4/2019 |
| CN | 110096411 A | 8/2019 |

* cited by examiner

Sample Messages

211 → error [TransactionID-AE12345678] : Found log configuration for cluster_id: 20191016-011111-777-szMlABab 212 → error [TransactionID-AE87654321] : LogConfig entry does not exist for clusterId: 20191016-022222-999-cAEVBSrT 213 → httpExecutor Received following error while trying to execute http request: Connect to abc-xxxxxx-yyy.dd.services.us-hhhhh.yyyyy.net:8000 [abc-xxxxxx-yyy.dd.services.us-hhhhh.yyyyy.net/192.168.210.10] failed: connect timed out 214 → httpExecutor Retry count: 1. Reached maximum allowed retries. This is the error message: Connect to abc-xxxxxx-yyy.dd.services.us-hhhhh.yyyyy.net:8000 [abc-xxxxxx-yyy.dd.services.us-hhhhh.yyyyy.net/192.168.210.10] failed: connect timed out

Templates extracted

221 → error [ <*> ] : Found log configuration for cluster_id : <*>

222 → error [ <*> ] : LogConfig entry does not exist for clusterId : <*>

223 → httpExecutor Received following error while trying to execute http request : Connect to <*> : NUMBER [ <*> ] failed : connect timed out 224 → httpExecutor Retry count : NUMBER. Reached maximum allowed retries . This is the error message : Connect to <*> : NUMBER [ <*> ] failed : connect timed out

```
cloud (Cloud,NN) 1.91934666E9
server (servers,NNS) 1.841470005E6
assist (assist, VBP) 1.8191998E9
account (accounts,NNS) 1.58064471E9
contact (contacting,VBG) 1.464847914E9
http (http,NN) 6.69753765E8
chat (chat,NN) 6.50550986E8
softlayer (softlayer,NN) 5.5592157E8
customer (Customer,NN) 4.0052418E8
time (time, NN) 4.0052418E8
check (check,VB) 3.55596952E8
question (question,NN) 3.3971091E8
service (service,NN) 3.12563592E8
email (email,NN) 2.63569256E8
order (order,NN) 2.31054768E8
sale (sales,NNS) 2.1367988E8
support (Support,NN) 1.82784376E8
internal (internal,JJ) 1.79153366E8
review (review,VBP) 1.70702616E8
case (case,NN) 1.59468373E8
issue (issue,NN) 1.5519411E8
transfer (transfer,VBP)1.53173912E8
create (creating,VBG) 1.48673721E8
order (order,VB) 1.39098781E8
send (sending,VBG) 1.3536969E8
data (data,NN) 1.17027557E8
reach (reached,VBN) 1.13327808E8
problem (problem,NN) 1.11657645E8
update (update,VB) 1.10546496E8
portal (portal,NN) 1.0485855E8
option (option,NN) 1.03492824E8
```

320

```
email address
virtual server
bare metal
data center
customer portal
metal server
credit card
master user
IP address
billing items
feel free
fully satisfied
chat history
private network
previous chat
load balancer
object storage
mother ass
account manager
OS reload
block storage
technical support
file storage
baremetal server
public IP
security questions
softlayer account
virtual machines
cloud account
internal account
live chat
additional questions
image templates
```

| Template | # of msgs |
|---|---|
| E03, INTERNET_ADDR_WITH_PORT close, NUMBER bytes (NUMBER BYTE_UNIT) sent, NUMBER bytes received, lifetime TIME | 121 |
| E06, INTERNET_ADDR_WITH_PORT close, NUMBER bytes (NUMBER BYTE_UNIT) sent, NUMBER bytes (NUMBER BYTE_UNIT) received, lifetime <*> | 303 |
| E07, INTERNET_ADDR_WITH_PORT close, NUMBER bytes sent, NUMBER bytes received, lifetime TIME | 355 |
| E10, INTERNET_ADDR_WITH_PORT close, NUMBER bytes sent, NUMBER bytes (NUMBER BYTE_UNIT) received, lifetime TIME | 168 |
| E00, <*> error: Could not connect to proxy INTERNET_ADDR_WITH_PORT - Could not resolved proxy.cse.cuhk.edu.hk error NUMBER <*> : indeed INTERNET_ADDR_WITH_PORT like "talk.google.com:5228" but no consensus because of "awqiizxegusxgr:80" | 20 |
| E01, INTERNET_ADDR_WITH_PORT open through proxy INTERNET_ADDR_WITH_PORT SOCKS5 | 2 |
| E02, INTERNET_ADDR_WITH_PORT error: Could not connect to proxy INTERNET_ADDR_WITH_PORT - connection attempt failed with error NUMBER | 26 |
| E04, INTERNET_ADDR_WITH_PORT open through proxy INTERNET_ADDR_WITH_PORT HTTPS | 954 |
| E05, INTERNET_ADDR_WITH_PORT error: A connection request was canceled before the completion | 31 |
| E08, INTERNET_ADDR_WITH_PORT error: Could not connect through proxy INTERNET_ADDR_WITH_PORT - Proxy server cannot establish a connection with the target, status code NUMBER | 17 |
| E09, INTERNET_ADDR_WITH_PORT error: Could not connect through proxy INTERNET_ADDR_WITH_PORT - Proxy closed the connection unexpectedly | 3 |

*FIG. 4*

ADAPTIVE LOG ANALYSIS

BACKGROUND

Technical Field

The present disclosure generally relates to processing and analysis of log messages generated by computing or network systems.

Description of the Related Arts

In computing, a log is a message or file that records either events that occur in an operating system or other software runs, or messages between different users of a communications software. For example, a transaction log is a file of the communication between a system and the users of that system, or a data collection method that automatically captures the type, content, or time of transactions made by a user with that system. For Web searching, a transaction log is an electronic record of interactions that have occurred during a searching episode between a Web search engine and users searching for information on that Web search engine. A logging system enables a dedicated, standardized subsystem to generate, filter, record, and analyze log messages. Analyzing the data stored in transaction logs may provide valuable insight into understanding the system that generates the logs.

In managing modern computing system, it is of great interest to have real time information about errors so that an administrator may determine where in the system errors are occurring and which errors are the most dominant. In a system that has hierarchical structures such clusters, nodes, pods, and applications, it is useful to identify regions in the system in which dominant errors are occurring.

SUMMARY

Some embodiments of the disclosure provide a log analyzer for obtaining information and status about a monitored system by adaptively analyzing log messages. A log analyzer receives log messages generated by a monitored system. The log analyzer identifies static and variable portions in the received log messages. The log analyzer generates a template based on the identified static and variable portions of the received log messages. The log analyzer computes a metric for the generated template based on a number of log messages that fall within the template. The log analyzer reports a status in the monitored system based on the computed metric.

In some embodiments, the static and variable portions of the log messages are identified by using a dictionary of meaningful words that are identified based on statistics of words appearing in log messages. The statistics of the words appearing in log messages may be used to identify meaningful words to include in the dictionary and meaningless (or low entropy) words to exclude from the dictionary. In some embodiments, the static and variable portions of the log messages are identified by a list of words that co-occur in the log messages. In some embodiments, the log analyzer allows an update to the dictionary by a user or an SME.

In some embodiments, a template is incrementally updated based on subsequently received log messages of a same domain. In some embodiments, existing templates are used as a seed to create new templates. In some embodiments, the log analyzer groups a set of related log messages and identifies a set of templates that the set of related log messages fall within as a template model. The log analyzer may add a particular template to the template model when one or more log messages of the set of related log messages fall within the particular template. The log analyzer may also remove a particular template from the template model when no log message of the set of related log messages fall within the particular template.

In some embodiments, the log analyzer computes a metric for each template in its template library with regard to the incoming log messages. In some embodiments, the metric is computed based on a ratio of number of log messages that fall within the template with respect to total number of log messages.

The log analyzer may also determine a time frame of occurrence for the reported status based on a time stamp of a log message that fall within the template. In some embodiments, the reported status of the monitored system is identified based on a template having a highest metric among multiple templates in the template library. The log analyzer may determine a time frame of occurrence for the reported status based on one or more timestamps in the incoming log messages that fall within a template model that is related to the reported status.

By inferring templates from log messages, the log analyzer is able to automatically detect issues arising from a monitored system that generates the log messages. The log analyzer measures the performance metrics of the templates with regard to the log messages in order to further refine the templates. The log analyzer therefore improves the efficiency of system monitoring.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 2 illustrates corresponding example log messages and example templates.

FIG. 3a provides an example dictionary of stop words that are identified by the log analyzer.

FIG. 3b provides an example list of co-occurring words or tokens identified by the log analyzer.

FIG. 4 illustrates example templates and the corresponding number of log messages that fall within the template.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Some embodiments of the disclosure provide a log analyzer for obtaining information and status about a system based on log messages generated by the system. As log messages tend to be mostly repetitive lines with missing variables, the log analyzer extracts patterns from the content of the log messages to explain the issues at hand, such as where in the system errors are occurring and what types of errors are occurring. The log analyzer is capable of learning by inferring new templates based on the content of the received log messages and does not presume any specific known format.

In some embodiments, the log analyzer performs template extraction by identifying static and variable portions of a heterogeneous collection of timestamped log data. The log analyzer treats log data as a multi-variate timeseries, recursively learning templates by obtaining input to create custom variables. The identified static and variable portions are used to form new templates. The learned templates can in turn be viewed as a time series that shows events and issues occurring in the system at various time intervals. In some embodiments, the log analyzer incrementally learns new templates through seeding of an original model template. The log analyzer determines a ratio or percentage of log messages for each template as a metric for the template. The log analyzer also captures metrics of newly appeared templates as well as metrics of disappeared templates.

Figure 1:
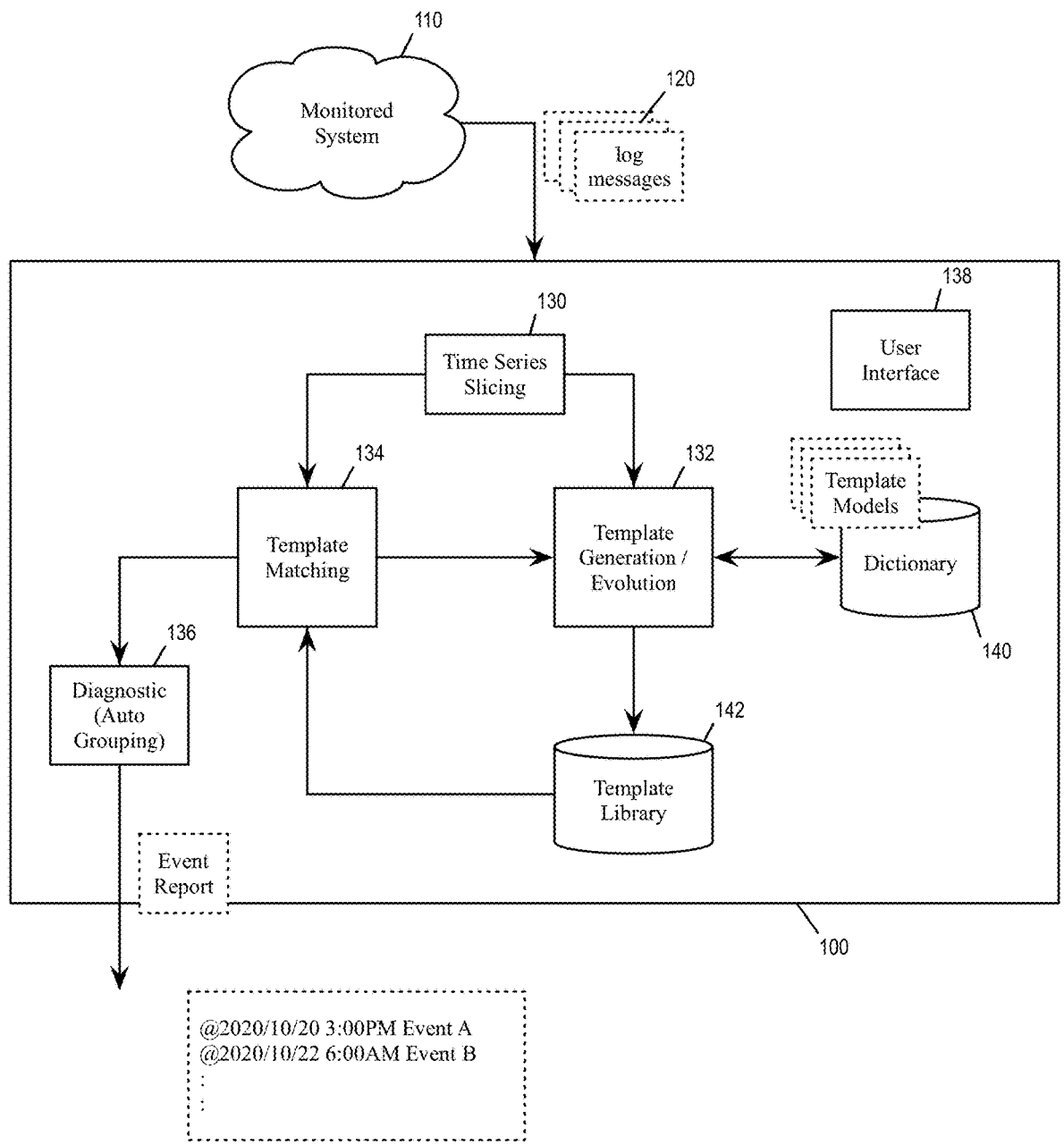
FIG. 1 conceptually illustrates a log analyzer that analyzes log messages generated by a monitored system to identify issues in the system, consistent with an illustrative embodiment.

FIG. 1 conceptually illustrates a log analyzer 100 that analyzes log messages generated by a monitored system 110 to identify issues in the system. An example of such a system may be a passenger management system that includes component systems for billing, notification, payments, driver management, trip management, etc. The monitored system 110 may also include various network or communications interface components. As illustrated, the system 110 generates log messages 120, which may reflect various real time status, events, errors, or other types of issues occurring at different component systems or different hierarchical levels of the system 110. The log messages 120 generated may exhibit different patterns that correspond to different issues being reported by different components or hierarchical levels of the system 110.

The log analyzer 100 receives the generated log messages 120, and generates various templates based on the different patterns found in the log messages 120. As different patterns in log messages may correspond to different issues occurring in the system 110 at different times, the log analyzer 100 may detect and report those issues based on metrics related to individual templates (e.g., number of messages having patterns that fit a particular template).

As illustrated, the log analyzer 100 includes a time series slicing module 130, a template generation module 132, a template matching module 134, a diagnostic module 136, and a user interface module 138. In some embodiments, a computing device implements the modules 130-138. In some embodiments, the modules 130-138 are modules of software instructions being executed by one or more processing units (e.g., a processor) of the computing device. In some embodiments, the modules 130-138 are modules of hardware circuits implemented by one or more integrated circuits (ICs) of an electronic apparatus. Though the modules 130, 132, 134, and 136 are illustrated as being separate modules, some of the modules can be combined into a single module. An example computing device 700 that may implement the log analyzer 100 will be described by reference to FIG. 7 below.

The time series slicing module 130 assigns log messages into different time slices or time frames. As templates are extracted from log messages, this allows the log analyzer 100 to associate templates extracted from a set of log messages with the specific time frames. In some embodiments, this also allows the log analyzer 100 to report the time at which status or events of the system 110 are occurring. In some embodiments, the log messages 120 are time sliced based on time stamps associated with the log messages. In some embodiments, the log messages are time sliced based on an anchoring message. In some embodiments, the time series slicing module 130 assigns a burst of log messages into a same time slice. In some embodiments, the log messages being time sliced into a same time frame are related messages of a same domain (e.g., from a same region of the monitored system 110).

The template generation module 132 extracts templates by analyzing patterns in the log messages or a given dataset. Unlike documents typically generated by humans, log messages are generated by machines through printf style statements. These statements typically have variables filled in at the time of generation of these logs. For example, consider: Failed to index IndexableDocument with id index,None)), where the web_crawl_566612-ffff-abcd-8888-00099999 is potentially an identifier for the document being indexed. The goal of template extraction is then to identify the variables from each of these log messages.

In some embodiments, each log message is parsed into tokens or component word. It is noted that standard tokenization or parsing techniques based on specific symbols or words may not work, since the log messages may be laced with JSON, parenthesis, and other software related event monitoring instrumentation. In order to parses the log messages, the template generation module 132 is bootstrapped with regular expression (regex) processing capabilities. For example, punctuations at beginning and end are detached and added as separate tokens, such as "-:www.abc.com:8080----" is processed as "-:", "www.abc.com:8080", "---". The template generation module 132 may also perform regular expression based type-marking, such as "www.abc.com:8080" is typed marked as "INTERNET_ADDR_WITH_PORT". The template generation module 132 may also perform sequence regular expression replacement, such as replacing "1 sec" with "NUMBER" and "sec" with "TIME". The template generation module 132 may also receive from the user interface 138 user defined regular expressions and be configured to perform corresponding parsing operations.

FIG. 2 illustrates corresponding example log messages 211-214 and example templates 221-224. The example templates 221-224 are generated based on (or extracted from) the patterns of the log messages 211-214, respectively. Various portions of the messages 211-214 are identified as variable or static by the log analyzer 100. For example, in the message 211, "error" and "Found log configuration_id:" are identified as static portions of the message 211 and are reproduced in the extracted template 221. On the other hand, the string "TransactionID-AE12345678" and the string "20191016-011111-777-szM1ABab" are identified as variable portions of the message 211 and are replaced by a notation "<*>" in the extracted template 221.

The template generation module 132 may also identify a variable portion of the log messages 120 as belonging to a particular type. The log analyzer 100 may type-mark that variable portion based on certain known structures in a template. For example, for the message 214, the log analyzer 100 type-mark the variable portion of the message between the static portions "httpExecutor Retry count:" and "Reach maximum allowed retries" as "NUMBER" in the template 224. In some embodiments, the template generation module 132 is configured to identify multiple different types of variables, such as email addresses, IP addresses, time stamps, etc.

In some embodiments, the template generation module 132 also performs dictionary induction and filtering. Specifically, the template generation module 132 compiles a dictionary 140, which includes a list of words or tokens that are known to be meaningful in message logs. Words or tokens that are determined to be meaningless or low entropy are excluded from the dictionary 140. The meaningful words are also referred to as stop words in some embodiments. The template generation module 132 may also receive user input from the user interface 138 to add or remove stop words from the dictionary 140. The template generation module 132 extracts templates from the log messages based on the static and variable words identified from the log messages 120, and by using the content of the dictionary 140.

In some embodiments, the message parser determines which words are meaningful and which words are meaningless based on statistics, e.g., the number of times that the log analyzer 100 encounters each word in the received log messages. FIG. 3a provides an example dictionary 310 of stop words that are identified by the log analyzer 100. Each identified stop word is accompanied by its corresponding statistics. In some embodiments, the statistics of a word is used to establish the word's meaningfulness. In some embodiments, the message parser may also determine which sets or pairs of words tend to co-occur. These sets or pairs of words or tokens appear together or provide context for each other. FIG. 3b provides an example list 320 of co-occurring words or tokens identified by the log analyzer. In some embodiments, the template generation module 132 may index sentences and type-mark co-occurring pairs. For example, the string "ABC:www.abc.com" may be type-marked as <0,"ABC">, <1,INTERNET_ADDR_WITH_PORT>.

In some embodiments, the template generation module 132 uses a finite state machine with a single counter for variable length parsing and for processing conditional expressions such as if-else, for loops, open and close parenthesis or brackets, etc. In some embodiments, template generation module 132 may traverse the hierarchy of the system 100 when processing a log message, and the counter based mechanism is used to track such traversal.

In some embodiments, the template generation module 132 performs a tokenization step to identify tokens in the content of log messages. In some embodiments, an extracted template may include regular expressions with a single counter to represent tokens. A regular expression with counters may include two regular expressions pos_regex and a neg_reg; when a pos_regex is encountered, the counter is incremented by one; and when a neg_regex is encountered the counter is decremented by one. In some embodiments, an extracted template may include a tree of named keys to represent a JSON string or XML string.

In some embodiments, the template generation module 132 performs a sequence clustering algorithm based on co-occurrence and index of words to extract templates. Specifically, the algorithm learns the conditional probability of the iˆth token in a log given the jˆth token. Token at index i is considered a variable if sum over all j!=i, $Pr(i|j)/(n-1) <$threshold, where n is the length of the log expressed in number of tokens. The variables identified are replaced by a static token $VARIABLE and the algorithm is repeated to identify more variables, until none can be found. In some embodiments, the threshold is a parameter that the user or a subject matter expert (SME) may control through the user interface 138.

In some embodiments, a token can itself be recursively templated. For example, in some embodiments, at the coarse grained application, an entire JSON string inside a text log message may appear as a single token. However, that token can be further specialized into JSON templates based on the tree of named keys approach mentioned above. This step may be done with user or SME feedback through the user interface 138 to selectively template tokens identified in any round of template extraction. The step can be recursively applied any number of times to produce richer (or more fine-grained) templates.

Data in log messages is often nested, and the template generation module 132 may correspondingly extract templates recursively and hierarchically. For example, for a system having a microservice architecture, log data can become deeply nested as microservices can call each other in a nested fashion. For example, consider the chain C→B→A, if an error in A is thrown, it is captured by B, which formats it as JSON and that is thrown to C, which also in turn formats it as JSON. This results in a nested log of the form JSON_C {JSON_B{JSON_A}}.

The extracted templates are stored in a template library 142. The template library 142 stores one or more template models. Each template model is a collection of templates that correspond to a set of (related) log messages that are generated within a same time frame (as divided by the time slicing module 130). The log messages are analyzed to detect occurrence of changes and unusual events. Subsequent log messages arriving at the log analyzer 100 may fall into templates belonging to different template models. In some embodiments, a template may newly appear in an existing template model when there is one or more log messages that fall within the new template, which did not exist in the template model. Conversely, an existing template may disappear from an existing template model when there are no log messages that fall under the template.

The template models included in the template library 142 may also include pre-existing models, which are learned from a large volume of historical data. These pre-existing template models can be used to match, predict, or identify templates for a given input. The pre-existing models are useful when the expected logs are more or less following the same format as in the past. The template models in the template library 142 can also be used to detect anomalies in the system 110, such as when no pre-existing template models match the incoming log messages.

The template matching module 134 applies the extracted templates to the log messages 120 from the system 110 and computes a metric for each extracted template. Computing metrics for templates allows changes to templates over time to be quantified. In some embodiments, the metric of a template is a matching score that is determined based on a number of log messages that fall within the template, i.e., a number of log messages having content that fits the pattern described by the template. FIG. 4 illustrates example templates and the corresponding number of log messages that fall within the template. In some embodiments, the template metric is determined based on a ratio of number of log messages that fall within the template with respect to total number of log messages. In some embodiments, whether a template is to newly appear in template model or to disappear from a template model is determined based on the metrics measured for the template.

In some embodiments, the log analyzer 100 generates a new template when more than a threshold number of incoming log messages fail to fall within any existing templates. The log analyzer may generate the new template based on an existing template that is selected from the template library 142. The log analyzer 100 may select a template having a best correlation score with the log messages that fail to fall within any existing templates. The selected existing template serves as an original template from which a child template is evolved from. The inference or extraction of templates is therefore an iterative process, where existing templates may be used to create newer templates, and the existing templates may be incrementally updated as data from newer log messages (from the same domain as the log messages used to extract the original existing template) become available.

The diagnostic module 136 report status of the system based on the metrics that are determined for the templates. Specifically, incoming log messages 120 are analyzed using template models in the template library 142, such that the log messages of a same domain may disproportionately fall within the templates of a particular template model, and the particular template model may in turn have higher metrics than other template models in the library for those log messages. The diagnostic module 136 uses the template metrics reported by the template matching module 134 to identify the highest scoring template model. The diagnostic module 136 may identify different template models for different time frames or time slices, the different time frames being defined by the time series slicing module 130 based on the time stamps of the incoming log messages.

Figure 5:
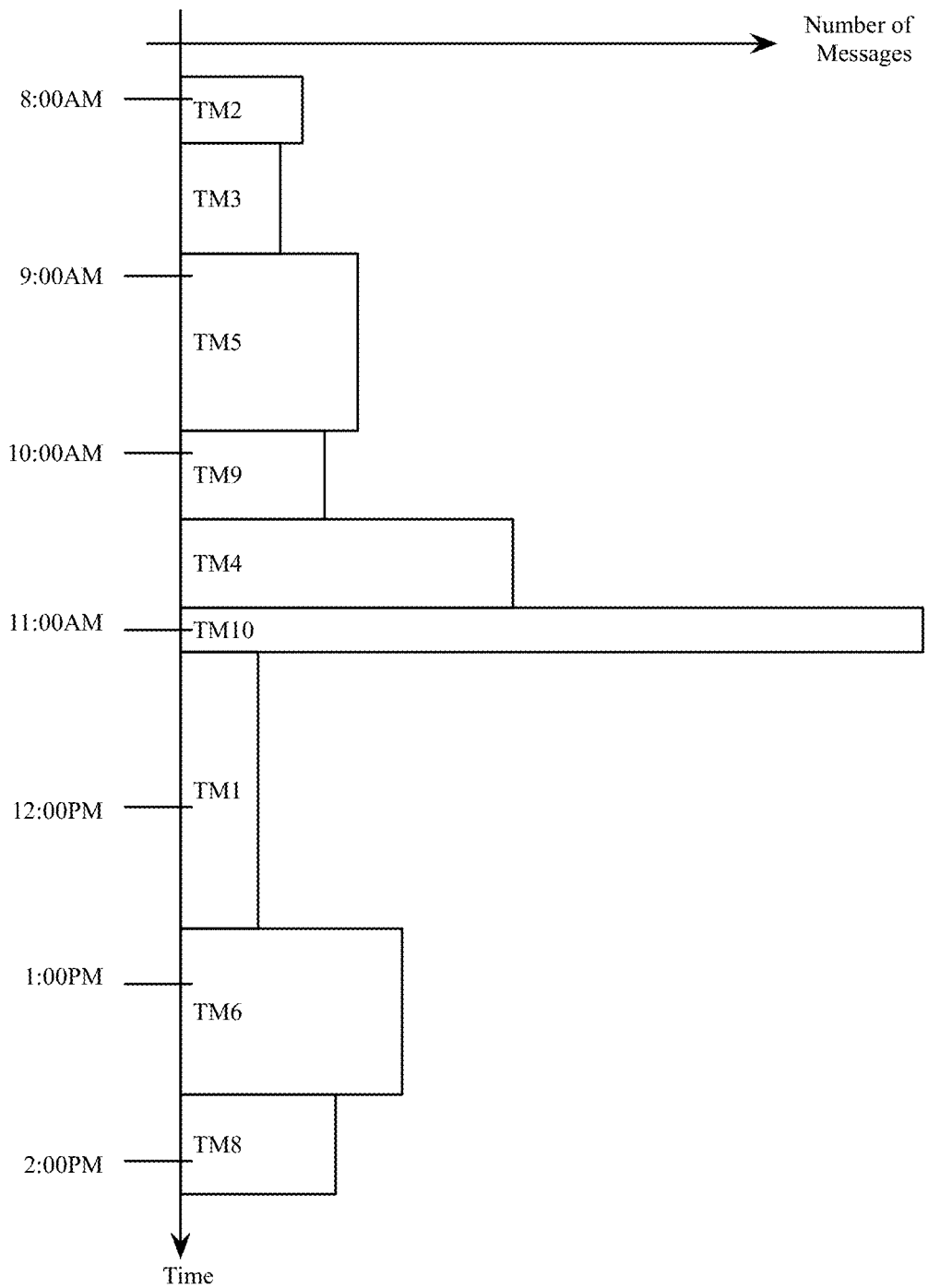
FIG. 5 conceptually illustrates an example report generated by the log analyzer.

FIG. 5 conceptually illustrates an example report generated by the log analyzer 100. As illustrated, at different times of a day, different template models (TM1 through TM10) are reported as being the highest scoring template model based on metrics that are computed for those template models. In some embodiments, at least some of the template models are associated with different components or hierarchical levels of the system, or with certain types of events or issues. The diagnostic module 136 may use the scores or metrics of templates or template models to report a status or an issue of the system at a specific time frame.

Figure 6:
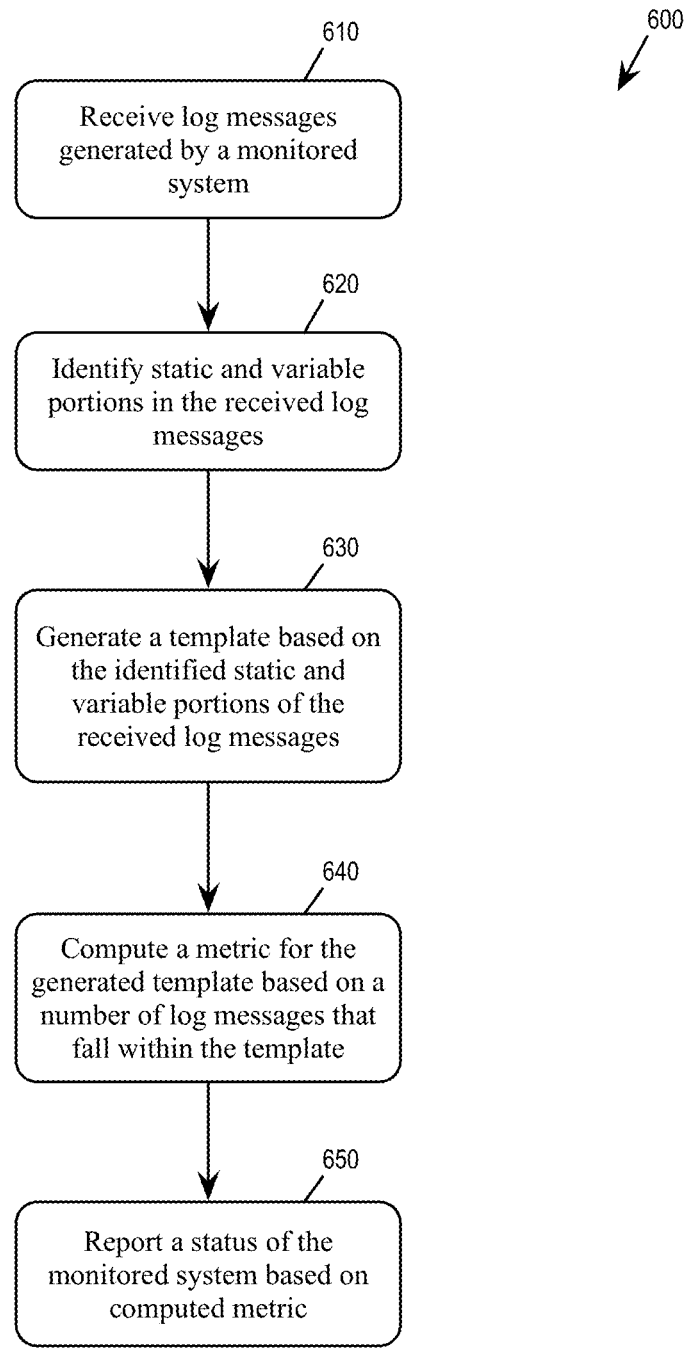
FIG. 6 conceptually illustrates a process for extracting templates from log messages and for using metrics of the extracted templates to report the status of a monitored system, consistent with an illustrative embodiment.

FIG. 6 conceptually illustrates a process 600 for extracting templates from log messages and for using metrics of the extracted templates to report the status of a monitored system, consistent with an illustrative embodiment. In some embodiments, one or more processing units (e.g., processor) of a computing device implementing the log analyzer 100 perform the process 600 by executing instructions stored in a computer readable medium.

The log analyzer receives (at block 610) log messages generated by a monitored system (such as the system 110). The log analyzer identifies (at block 620) static and variable portions in the received log messages. In some embodiments, the static and variable portions of the log messages are identified by using a dictionary of meaningful words that are identified based on statistics of words appearing in log messages. The statistics of the words appearing in log messages may be used to identify meaningful words to include in the dictionary and meaningless (or low entropy) words to exclude from the dictionary. In some embodiments, the static and variable portions of the log messages are identified by a list of words that co-occur in the log messages. In some embodiments, the log analyzer allows updates to the dictionary by a user or an SME.

The log analyzer generates (at block 630) a template based on the identified static and variable portions of the received log messages. In some embodiments, a template is incrementally updated based on subsequently received log messages of a same domain. In some embodiments, existing templates are used as seed to create new templates. In some embodiments, the log analyzer groups a set of related log messages and identifies a set of templates that the set of related log messages fall within as a template model. The log analyzer may add a particular template to the template model when one or more log messages of the set of related log messages fall within the particular template. The log analyzer may also remove a particular template from the template model when no log message of the set of related log messages fall within the particular template.

The log analyzer computes (at block 640) a metric for the generated template based on a number of log messages that fall within the template. In some embodiments, the log analyzer computes a metric for each template in its template library with regard to the incoming log messages. In some embodiments, the metric is computed based on a ratio of number of log messages that fall within the template with respect to total number of log messages.

The log analyzer reports (at block 650) a status in the monitored system based on the computed metric. The status may relate to an issue or an error occurring at a particular region of the monitored system. The log analyzer may also determine a time frame of occurrence for the reported status based on a time stamp of a log message that fall within the template. In some embodiments, the reported status of the monitored system is identified based on a template having a highest metric among multiple templates in the template library. The log analyzer may determine a time frame of occurrence for the reported status based on one or more time stamps in the incoming log messages that fall within a template model that is related to the reported status.

By inferring templates from log messages, the log analyzer is able to automatically detect issues arising from a monitored system that generates the log messages. The log analyzer measures the performance metrics of the templates with regard to the log messages in order to further refine the templates. The log analyzer therefore improves the efficiency of system monitoring.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 6) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
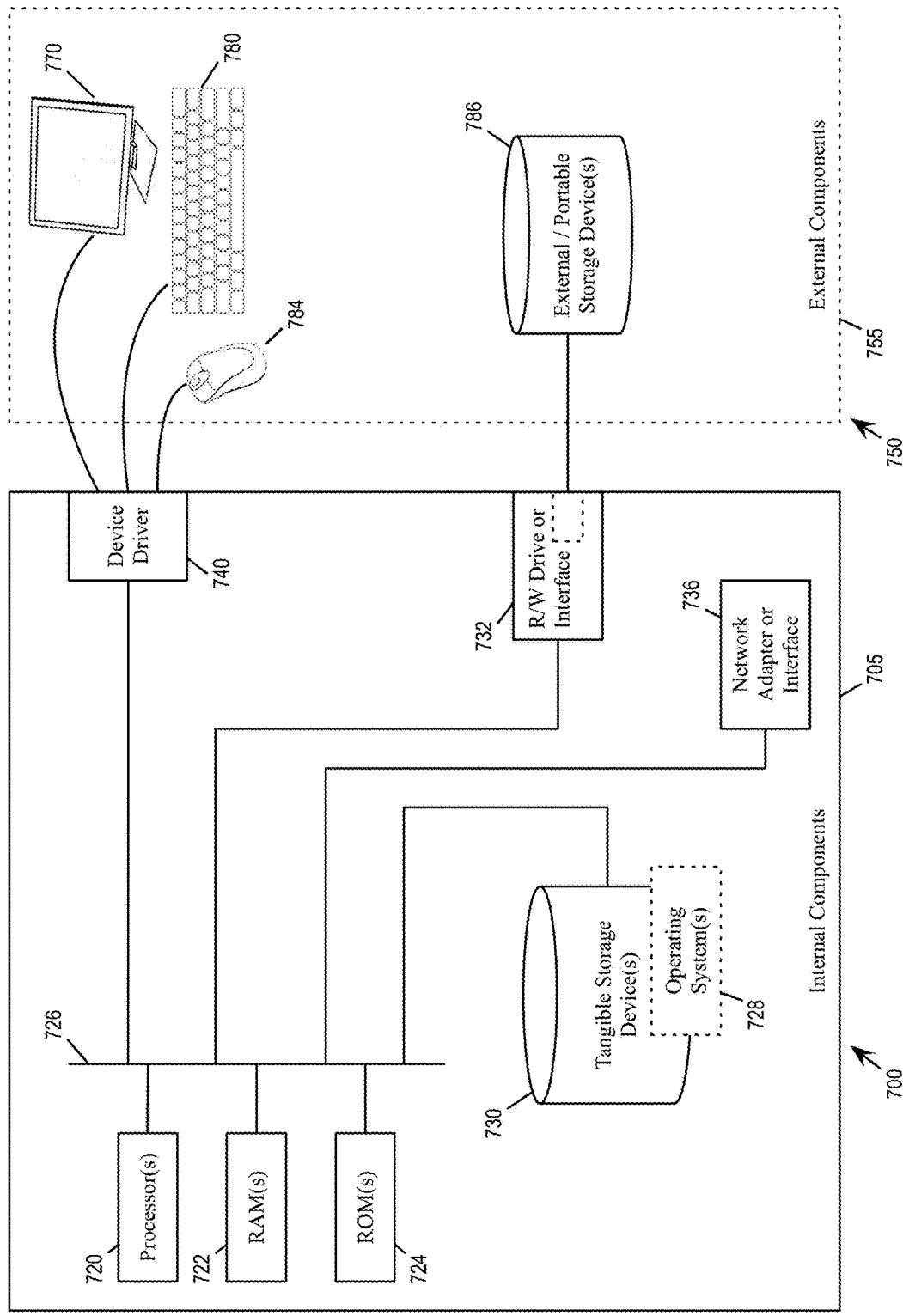
FIG. 7 shows a block diagram of the components of a data processing system in accordance with an illustrative embodiment of the present disclosure.

FIG. 7 shows a block diagram of the components of data processing systems 700 and 750 that may be used to implement a system for extracting templates from received log messages (i.e., the log analyzer 100) in accordance with an illustrative embodiment of the present disclosure. It should be appreciated that FIG. 7 provides only an illustration of one implementation and does not imply any limitations with regard to the environments in which different embodiments may be implemented. Many modifications to the depicted environments may be made based on design and implementation requirements.

Data processing systems 700 and 750 are representative of any electronic device capable of executing machine-readable program instructions. Data processing systems 700 and 750 may be representative of a smart phone, a computer system, PDA, or other electronic devices. Examples of computing systems, environments, and/or configurations that may represented by data processing systems 700 and 750 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 700 and 750 may include a set of internal components 705 and a set of external components 755 illustrated in FIG. 7. The set of internal components 705 includes one or more processors 720, one or more computer-readable RAMs 722 and one or more computer-readable ROMs 724 on one or more buses 726, and one or more operating systems 728 and one or more computer-readable tangible storage devices 730. The one or more operating systems 728 and programs such as the programs for executing the process 600 are stored on one or more computer-readable tangible storage devices 730 for execution by one or more processors 720 via one or more RAMs 722 (which typically include cache memory). In the embodiment illustrated in FIG. 7, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

The set of internal components 705 also includes a R/W drive or interface 732 to read from and write to one or more portable computer-readable tangible storage devices 786 such as a CD-ROM, DVD, memory stick, magnetic tape, magnetic disk, optical disk or semiconductor storage device. The instructions for executing the process 600 can be stored on one or more of the respective portable computer-readable tangible storage devices 786, read via the respective R/W drive or interface 732 and loaded into the respective hard drive 730.

The set of internal components 705 may also include network adapters (or switch port cards) or interfaces 736 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 736. From the network adapters (or switch port adaptors) or interfaces 736, the instructions and data of the described programs or processes are loaded into the respective hard drive 730. The network may comprise copper wires, optical fibers, wireless transmission, routers, firewalls, switches, gateway computers and/or edge servers.

The set of external components 755 can include a computer display monitor 770, a keyboard 780, and a computer mouse 784. The set of external components 755 can also include touch screens, virtual keyboards, touch pads, pointing devices, and other human interface devices. The set of internal components 705 also includes device drivers 740 to interface to computer display monitor 770, keyboard 780 and computer mouse 784. The device drivers 740, R/W drive or interface 732 and network adapter or interface 736 comprise hardware and software (stored in storage device 730 and/or ROM 724).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

On-demand self-service: a cloud consumer can unilaterally provision computing capabilities, such as server time and network storage, as needed—automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure that includes a network of interconnected nodes.

Figure 8:
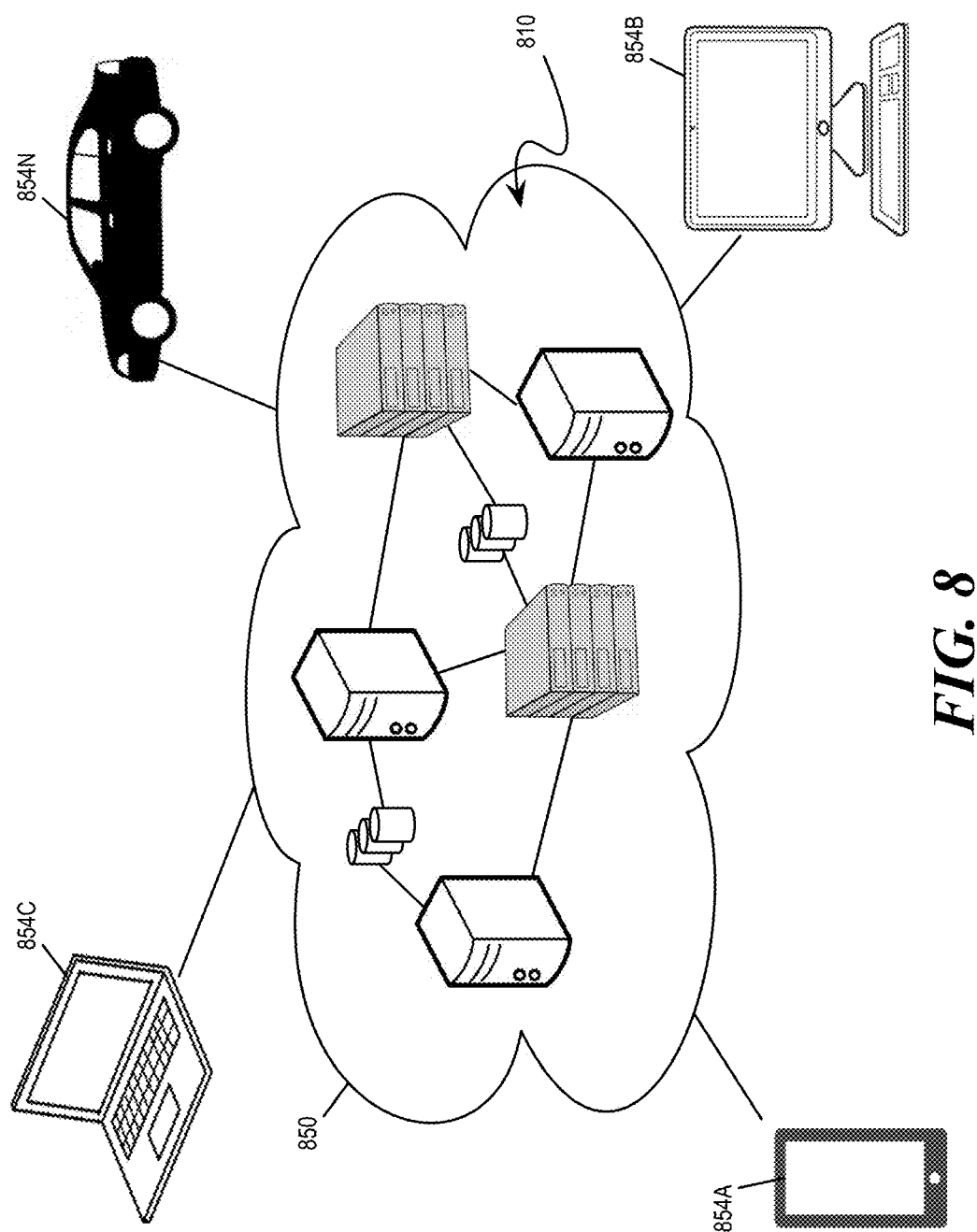
FIG. 8 illustrates an example cloud-computing environment.

Referring now to FIG. 8, an illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
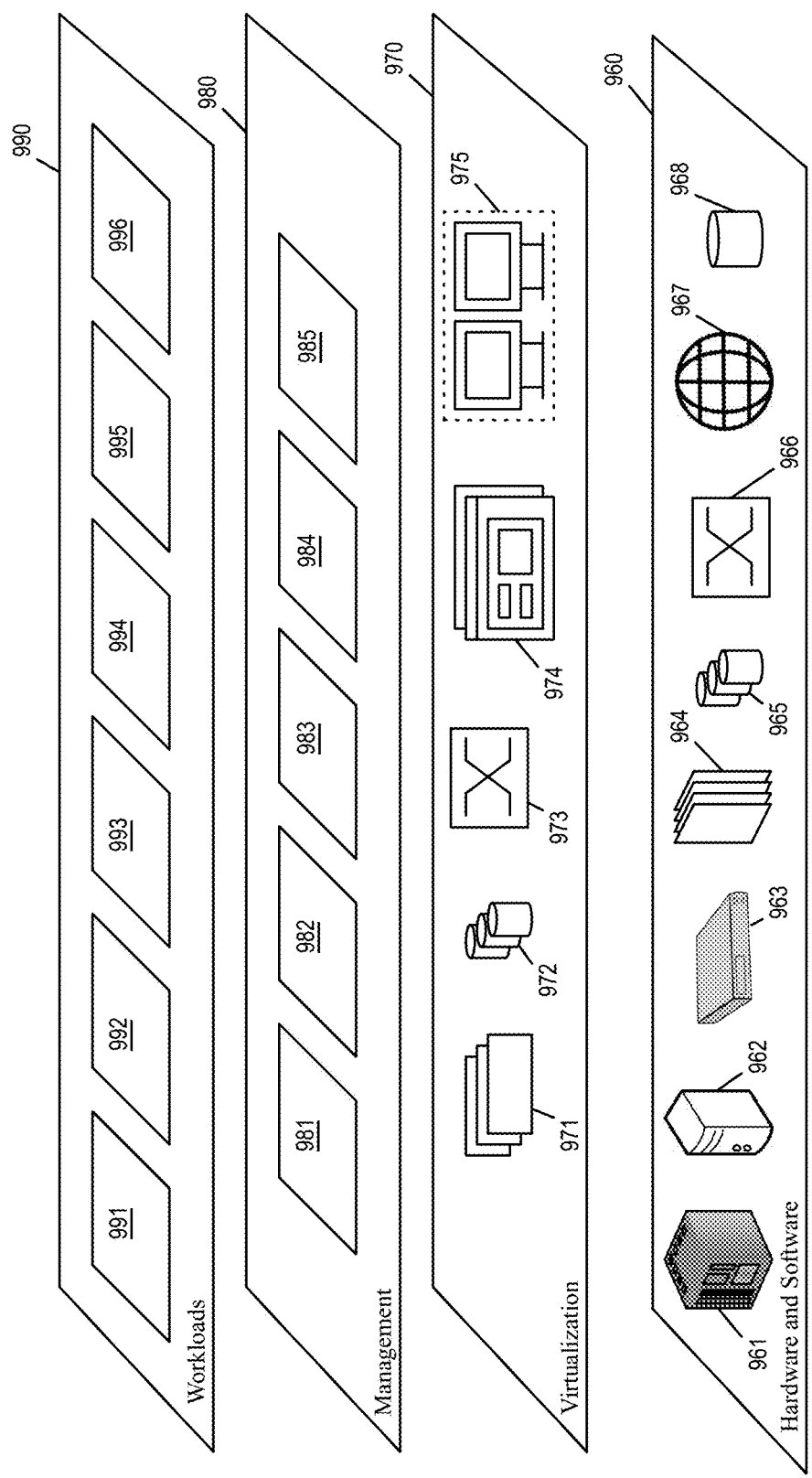
FIG. 9 illustrates a set of functional abstraction layers provided by a cloud-computing environment, consistent with an illustrative embodiment.

Referring now to FIG. 9, a set of functional abstraction layers provided by cloud computing environment 850 (of FIG. 8) is shown. It should be understood that the components, layers, and functions shown in FIG. 9 are intended to be illustrative only and embodiments of the disclosure are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud-computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and workload 996. In some embodiments, the workload 996 performs some of the operations of the log analyzer 100, e.g., template generation and matching.

The foregoing one or more embodiments implements a log analyzing system within a computer infrastructure by having one or more computing devices processing log messages and inferring templates from the log messages. The computer infrastructure is further used to computing performance metrics for the inferred templates.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
a processor; and
a storage device storing a set of instructions, wherein an execution of the set of instructions by the processor configures the computing device to perform acts comprising:
receiving one or more log messages generated by a monitored system;
identifying static and variable portions in the received log messages;
generating a template based on the identified static and variable portions of the received one or more log messages;
computing a metric for the generated template based on a number of log messages of the one or more log messages that fall within the template; and
reporting a status in the monitored system based on the computed metric.

2. The computing device of claim 1, wherein the static and variable portions of the one or more log messages are identified by using a dictionary of meaningful words that are identified based on statistics of words appearing in log messages.

3. The computing device of claim 1, wherein the static and variable portions of the one or more log messages are identified by a list of words that co-occur in the log messages.

4. The computing device of claim 1, wherein an execution of the set of instructions by the processor further configures the computing device to perform an act comprising:
determining a time frame of occurrence for the reported status based on a time stamp of a log message that falls within the template.

5. The computing device of claim 1, wherein the status of the monitored system is reported based on a template having a highest metric among a plurality of generated templates.

6. The computing device of claim 1, wherein the template is incrementally updated based on one or more subsequently received log messages.

7. The computing device of claim 1, wherein an execution of the set of instructions by the processor further configures the computing device to perform an act comprising:
identifying a set of related log messages and identifying a set of templates that the set of related log messages fall within, as a template model.

8. The computing device of claim 7, wherein an execution of the set of instructions by the processor further configures the computing device to perform acts comprising:
adding a particular template to the template model when one or more log messages of the set of related log messages fall within the particular template; and
removing a given particular template from the template model when no log messages of the set of related log messages fall within the given particular template.

9. The computing device of claim 7, wherein an execution of the set of instructions by the processor further configures the computing device to perform acts comprising:
determining a time frame of occurrence for the reported status based on one or more time stamps in incoming log messages that fall within a template model that is related to the reported status.

10. The computing device of claim 1, wherein the metric is computed based on a ratio of number of log messages that fall within the template with respect to total number of log messages.

11. A computer program product comprising:
one or more non-transitory computer-readable storage devices and program instructions stored on at least one of the one or more non-transitory storage devices, the program instructions executable by a processor, the program instructions comprising sets of instructions for:
receiving one or more log messages generated by a monitored system;
identifying static and variable portions in the received log messages;
generating a template based on the identified static and variable portions of the received one or more log messages;
computing a metric for the generated template based on a number of log messages of the one or more log messages that fall within the template; and
reporting a status in the monitored system based on the computed metric.

12. A computer-implemented method comprising:
receiving log messages generated by a monitored system;
identifying static and variable portions in the received log messages;
generating a template based on the identified static and variable portions of the received log messages;
computing a metric for the generated template based on a number of log messages of the one or more log messages that fall within the template; and
reporting a status in the monitored system based on the computed metric.

13. The computer-implemented method of claim 12, wherein the static and variable portions of the one or more log messages are identified by using a dictionary of meaningful words that are identified based on statistics of words appearing in log messages.

14. The computer-implemented method of claim 12, wherein the static and variable portions of the one or more log messages are identified by a list of words that co-occur in the log messages.

15. The computer-implemented method of claim 12, further comprising determining a time frame of occurrence for the reported status based on a time stamp of a log message that fall within the template.

16. The computer-implemented method of claim 12, wherein the template is incrementally updated based on one or more subsequently received log messages.

17. The computer-implemented method of claim 12, further comprising:
identifying a set of related log messages; and
identifying a set of templates that the set of related log messages fall within as a template model.

18. The computer-implemented method of claim 17, further comprising adding a particular template to the template model when one or more log messages of the set of related log messages fall within the particular template.

19. The computer-implemented method of claim 17, further comprising removing a particular template from the template model when no log messages of the set of related log messages fall within the particular template.

20. The computer-implemented method of claim 12, wherein the metric is computed based on a ratio of a number of log messages that fall within the template with respect to a total number of log messages.

* * * * *